(12) United States Patent
Yang et al.

(10) Patent No.: US 7,912,121 B2
(45) Date of Patent: Mar. 22, 2011

(54) METHOD AND APPARATUS FOR PROCESSING VIDEO SIGNAL

(75) Inventors: Chi-Wei Yang, Taoyuan (TW); Chang-Hung Lee, Taoyuan (TW)

(73) Assignee: Qisda Corporation, Taoyuan County (TW)

( * ) Notice: Subject to any disclaimer, the term of this patent is extended or adjusted under 35 U.S.C. 154(b) by 1436 days.

(21) Appl. No.: 11/356,589

(22) Filed: Feb. 16, 2006

(65) Prior Publication Data

US 2006/0182173 A1   Aug. 17, 2006

(30) Foreign Application Priority Data

Feb. 16, 2005  (TW) ............................. 94104551 A

(51) Int. Cl.
*H04N 7/12* (2006.01)
*H04N 11/04* (2006.01)
*H04B 1/66* (2006.01)
*H04N 11/02* (2006.01)

(52) U.S. Cl. ........... 375/240.01; 375/240.1; 375/240.23; 375/240.24; 375/240.27

(58) Field of Classification Search ............. 375/240.01, 375/240.1, 240.24, 240.23, 240.27
See application file for complete search history.

(56) References Cited

U.S. PATENT DOCUMENTS

| | | | |
|---|---|---|---|
| 5,619,256 A * | 4/1997 | Haskell et al. | .................. 348/43 |
| 6,546,052 B1 * | 4/2003 | Maeda et al. | ............ 375/240.08 |
| 7,263,127 B1 * | 8/2007 | McVeigh et al. | ......... 375/240.15 |

* cited by examiner

*Primary Examiner* — Ted M Wang

(57) ABSTRACT

An apparatus for processing a video signal with N frames is provided. The apparatus includes an encoding module and a selecting module. The encoding module performs a $1^{st}$ through a $N^{th}$ encoding procedure. The $1^{st}$ through the $N^{th}$ encoding procedure respectively encodes the $1^{st}$ through the $N^{th}$ frame among the N frames in a full-image-encoding mode, encodes other frames in an adaptive-image-encoding mode, and calculates the data amount of the N encoded frames in each encoding procedure, respectively. The selecting module selects the N encoded frames with the smallest data amount among the encoding procedures been performed.

10 Claims, 4 Drawing Sheets

METHOD AND APPARATUS FOR PROCESSING VIDEO SIGNAL

BACKGROUND OF THE INVENTION

1. Field of the Invention

This invention relates to an apparatus and a method for processing a video signal. More specifically, this invention relates to an apparatus and a method for compressing a video signal.

2. Description of the Prior Art

Generally, a video signal is composed of a series of frames. Because of the effect of persistence of vision, a series of static pictures that are played back continuously is equivalent to a dynamic video signal for viewers. In general video signal processing systems, the frames in a video signal is compressed before being transmitted or stored. If the frames are not compressed first, the video signal would occupy large storage spaces and transmission bandwidth.

One characteristic of video signals is temporal redundancy, that is to say, in a video signal composed of a series of frames, there are usually high correlation and similarity between adjacent frames. Sometimes, most data in two adjacent frames are almost the same and there are only few differences.

To decrease the storage spaces or transmission bandwidth caused by temporal redundancy, there are two methods for encoding frames: full-image-encoding and adaptive-image-encoding. In a full-image-encoding mode, a frame is encoded without referring to other frames and is generally called an I-frame (intra-frame). In an adaptive-image-encoding mode, a frame is encoded with referring to frames adjacent to it and is generally called a P-frame (predictive frame) or B-frame (Bi-direction predictive frame). An encoded P-frame only includes the differences between the encoded frame and its reference frame. Therefore, P-frames generally have smaller data amounts than I-frames. On the contrast, P-frames cannot be decoded or regenerated without referring to its reference frame (might be an I-frame or an I-frame plus other P-frames).

In actual applications, although P-frames generally have smaller data amounts than I-frames, encoding most frames in an adaptive-image-encoding mode is not the best decision. Since every P-frame is compressed referring to adjacent I-frames or P-frames, if some frames are lost during transmissions, the following frames would not be decoded correctly until another I-frame is received. The aforementioned problem is named error propagation. To reduce the effect of error propagation, a parameter, video object plane (VOP), is specified in some video specifications. VOP represents a steady rate of generating I-frames. If the VOP is three, there are one I-frame and two P-frames among every three compressed frames.

In prior arts, the sequence of I-frame and P-frames is fixed after the VOP value is decided. For example, the first frame among every three compressed frames is set to be encoded in a full-image-encoding mode and the other two frames are set to be encoded in an adaptive-image-encoding mode. However, the selection of I-frames would affect the total data amount of a video signal. If I-frames are properly selected, the data amount of P-frames can be minimized. In prior arts, once the VOP value is decided, the sequence of I-frame and P-frames is fixed. In other words, the method of selecting I-frames in prior arts cannot guarantee the total data amount of a video signal is minimized.

Accordingly, this invention provides an apparatus and a method for processing a video signal. More specifically, the apparatus and method according to this invention can provide a minimum total data amount after compressing a video signal.

SUMMARY OF THE INVENTION

One main purpose of this invention is to provide an apparatus and a method for compressing a video signal including N frames.

One preferred embodiment according to this invention includes an encoding module and a selecting module. The encoding module performs a $1^{st}$ through a $N^{th}$ encoding procedure. The $1^{st}$ through the $N^{th}$ encoding procedure respectively encodes the $1^{st}$ through the $N^{th}$ frame among the N frames in a full-image-encoding mode, encodes other frames in an adaptive-image-encoding mode, and calculates the data amount of the N encoded frames in each encoding procedure, respectively. The selecting module selects the N encoded frames with the smallest data amount among the encoding procedures been performed.

Another preferred embodiment according to this invention further comprises a timer. The timer sets a predetermined time period for the operations of the encoding module. The timer starts to count a processing time when the encoding module starts to perform the $1^{st}$ encoding procedure. Once the processing time is larger than the predetermined time period, the selecting module selects the N encoded frames corresponding to the smallest data amount among the data amounts calculated in the encoding procedures been performed.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
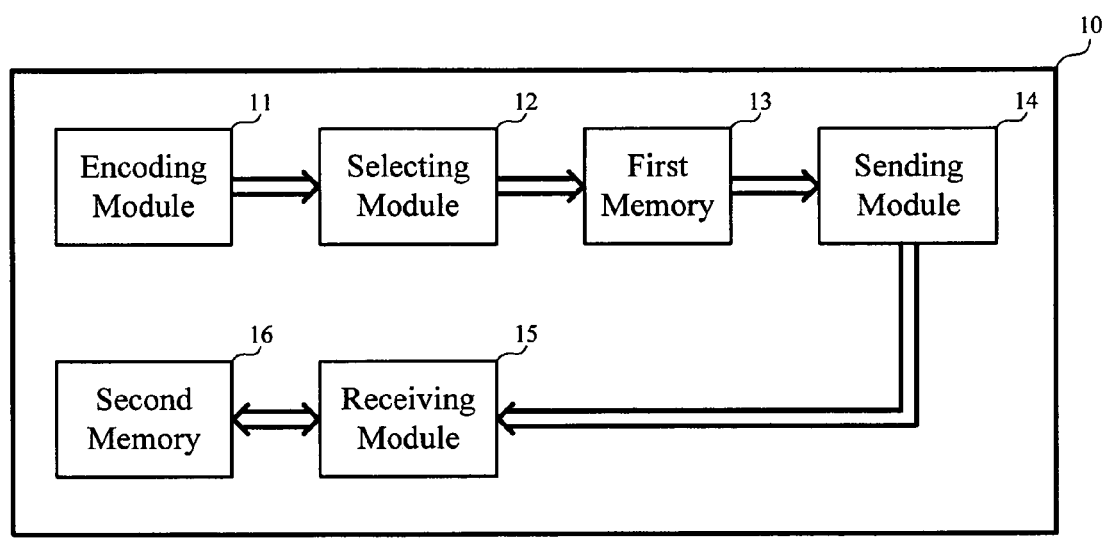
FIG. 1 shows the block diagram of the video signal processing apparatus in the first preferred embodiment according to this invention.

One main purpose of this invention is to provide an apparatus and a method for compressing a video signal including N frames.

The video signal processing apparatus of the first preferred embodiment according to this invention at least includes an encoding module and a selecting module. The encoding module performs a $1^{st}$ through a $N^{th}$ encoding procedure. The $1^{st}$ through the $N^{th}$ encoding procedure respectively encodes the $1^{st}$ through the $N^{th}$ frame among the N frames in a full-image-encoding mode, encodes other frames in an adaptive-image-encoding mode, and calculates the data amount of the N encoded frames in each encoding procedure, respectively. For example, assume N is equal to 5. When performing the $1^{st}$ encoding procedure, the encoding module first encodes the first frame in a full-image-encoding mode and encodes the second through the fifth frames in an adaptive-image-encoding mode. After the five frames are encoded, the encoding module calculates the total data amount of the five encoded frames corresponding to the $1^{st}$ encoding procedure. When performing the $2^{nd}$ encoding procedure, the encoding module first encodes the second frame in a full-image-encoding mode and encodes the first and the third through the fifth frames in an adaptive-image-encoding mode. After the five frames are encoded, the encoding module calculates the total data amount of the five encoded frames corresponding to the $2^{nd}$ encoding procedure.

The selecting module selects the N encoded frames with the smallest data amount among the encoding procedures been performed.

In actual applications, the video signal processing apparatus can store the N encoded frames selected by the selecting module in a memory or send out the encoded frames. There are two methods of sending out the encoded frames. The first method sends out the encoded frames according to their original sequence, or assigns each encoded frame a respective serial number first, then sends out the N encoded frames in sequence according to serial numbers. If the video signal processing module adopts the first method, the apparatus can further include an assigning module and a sending module. The assigning module assigns each encoded frame a respective serial number and the sending module sends the N encoded frames in sequence according to serial numbers. The apparatus can also include a receiving module for receiving the N encoded frames in sequence according to serial numbers. The first method sends out the full-image-encoded frame before sending the other adaptive-image-encoded frames. If the video signal processing module adopts the second method, the apparatus can further include a sending module. The sending module is used for sending out the full-image-encoded frame first and then sending out the other adaptive-image-encoded frames. The apparatus can also include a receiving module for receiving the full-image-encoded frame first and then receiving the other adaptive-image-encoded frames.

Take N=5 as an example. If the full-image-encoded frame is the third frame and the video signal processing apparatus adopts the first method of sending out the encoded frames, the sending module sequentially sends out the first through the fifth encoded frames and the receiving module sequentially receives the first through the fifth encoded frames. Because the first frame is adaptive-image-encoded referring to the third frame, the first frame cannot be regenerated until the third frame is received. Therefore, the apparatus must further include a memory for temporarily storing the first frame before the third frame is received. On the contrast, if the apparatus adopts the second method of sending out the encoded frames, the sending module first sends out the third frame and then sends out the first, second, fourth, and fifth encoded frames. Hence, the receiving module receives the third frame before the first frame. After decoding the third frame, the receiving module can then regenerate the first frame based on the third frame.

Please refer to FIG. 1. FIG. 1 shows the block diagram of the video signal processing apparatus in the first preferred embodiment according to this invention. The video signal processing apparatus 10 includes an encoding module 11, a selecting module 12, a first memory 13, a sending module 14, a receiving module 15, and a second memory 16.

The encoding module 11 performs a $1^{st}$ through a $N^{th}$ encoding procedure. The selecting module 12 selects the N encoded frames with the smallest data amount among the encoding procedures been performed. The first memory 13 is used for storing the N encoded frames selected by the selecting module 12. The sending module 14 accesses the N encoded frames from the first memory 13 and sequentially sends the N encoded frames to the receiving module 15. After sequentially receiving the N encoded frames, the receiving module 15 might temporarily store the received frames in the second memory 16 or regenerate the received frames.

In actual applications, there are also two different methods for the encoding module 11 to encode frames in an adaptive-image-encoding mode. The first method encodes adaptive-image-encoded frames based on the ith frame in the ith encoding procedure, wherein i is an integer index ranging from 1 to N. The second method encodes one adaptive-image-encoded frame based on the ith frame and the other adaptive-image-encoded frames.

When being requested to regenerate the encoded frames, the video signal processing apparatus 10 can further include a regenerating module. The regenerating module first accesses the N encoded frames stored in the memory. If the encoding module 11 adopts the first method to encode frames, the regenerating module regenerates one adaptive-image-encoded frame based on the full-image-encoded frame. If the encoding module 11 adopts the second method to encode frames, the regenerating module regenerates one adaptive-image-encoded frame based on the full-image-encoded frame and the other adaptive-image-encoded frames.

In some applications, there is a time limitation for compressing a video signal. Therefore, the video signal processing apparatus in the second preferred embodiment according to this invention further includes a timer except an encoding module and a selecting module. The timer sets a predetermined time period for the operations of the encoding module. The timer starts to count a processing time when the encoding module starts to perform the $1^{st}$ encoding procedure. Once the processing time is larger than the predetermined time period, the selecting module selects the N encoded frames corresponding to the smallest data amount among the data amounts calculated in the encoding procedures been performed.

Figure 2:
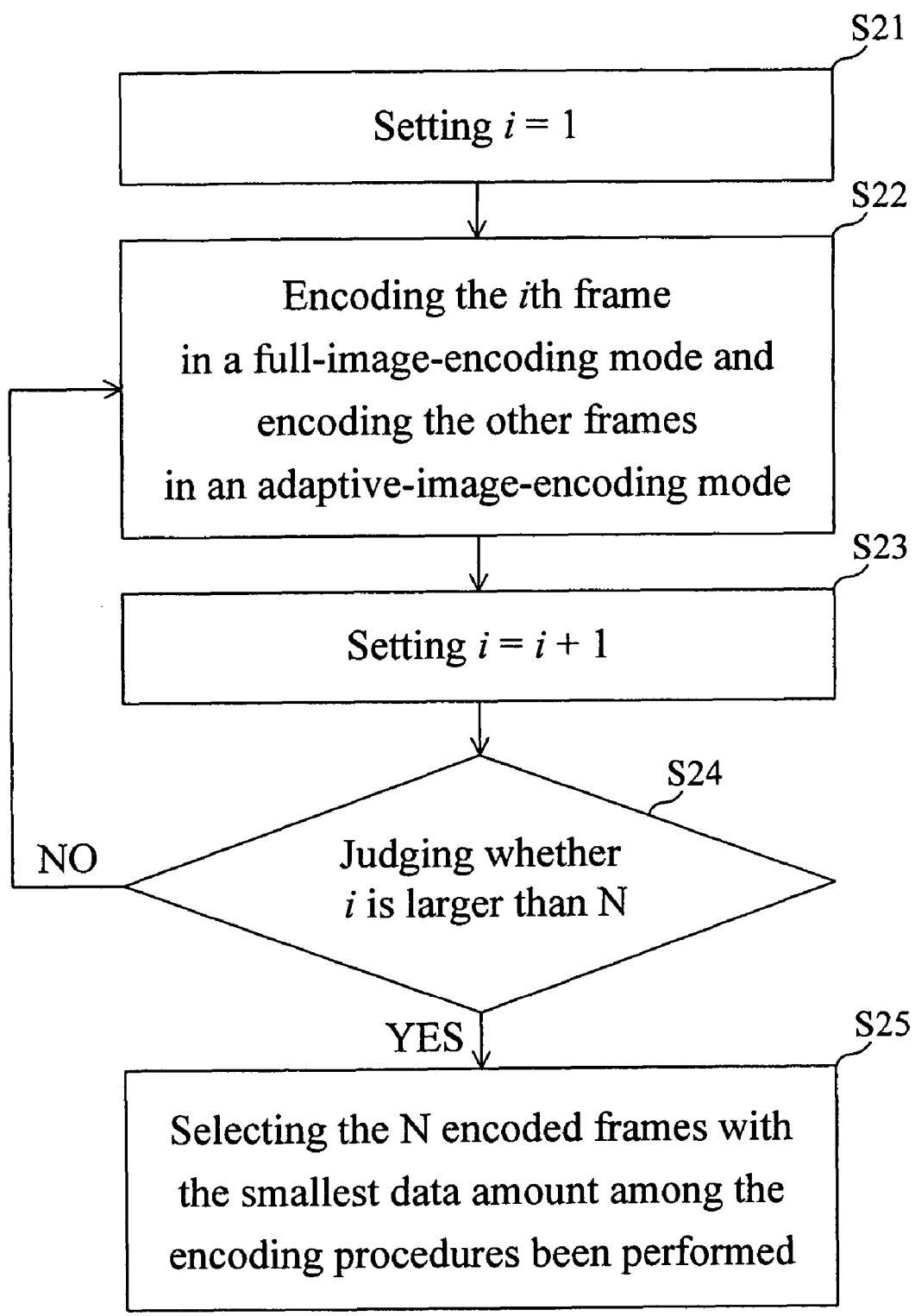
FIG. 2 shows the flow chart of the video signal processing method in the third preferred embodiment according to this invention.

Please refer to FIG. 2. FIG. 2 shows the flow chart of the video signal processing method in the third preferred embodiment according to this invention. The video signal processing method first performs step S21 to set an index i as 1, then performs an ith encoding procedure in step S22. At the ith encoding procedure, the ith frame of the N frames is encoded in a full-image-encoding mode, the other frames are encoded in an adaptive-image-encoding mode, and the data amount of the N encoded frames is calculated. Step S23 sets i=i+1. Step S24 is checking whether i is larger than N. If the checking result of step S24 is NO, the video signal processing method repeats step S22 through step S24. If the checking result of step S24 is YES, the video signal processing method performs step S25 to select the N encoded frames with the smallest data amount among the encoding procedures been performed.

Figure 3:
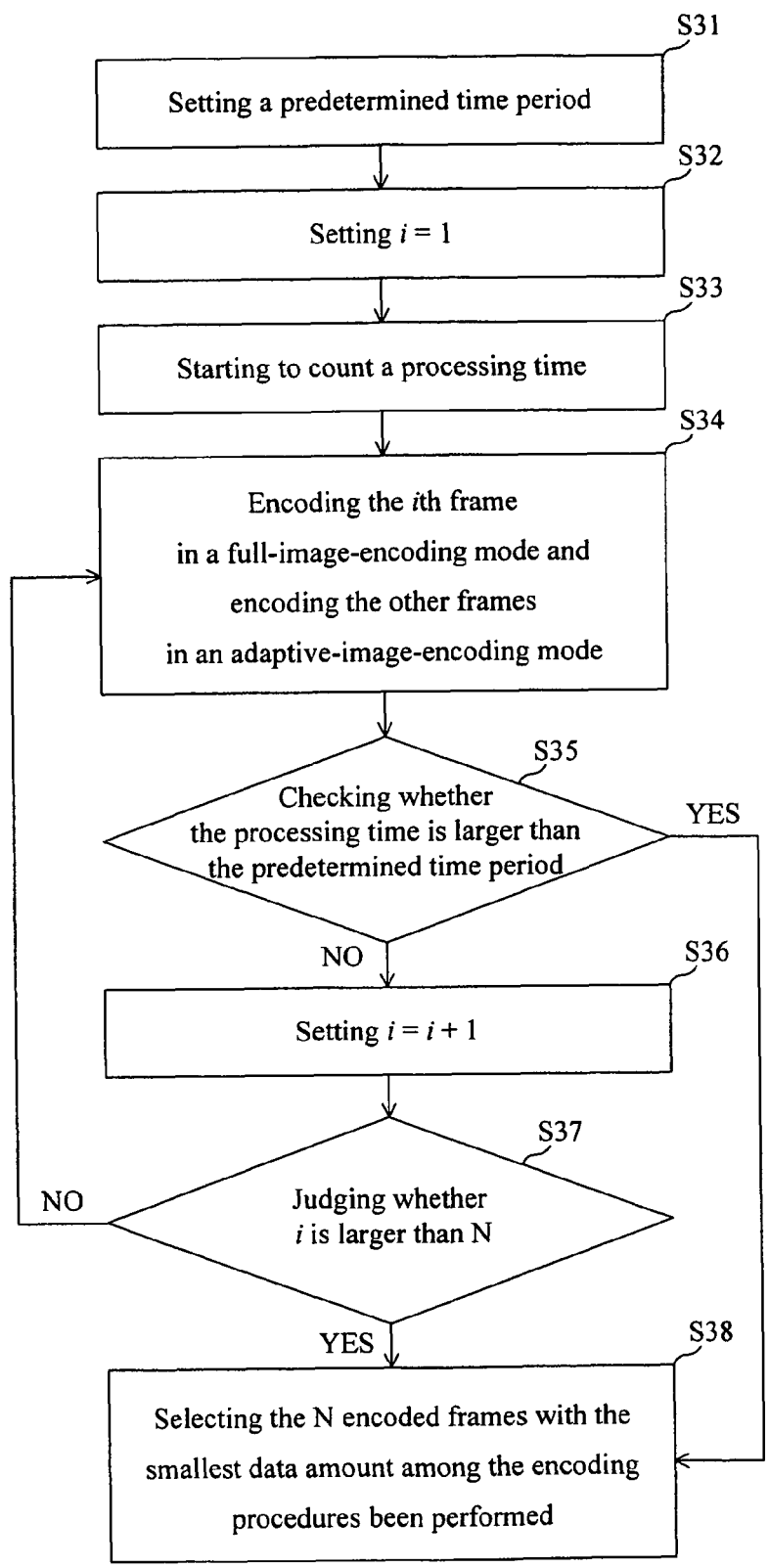
FIG. 3 shows the flow chart of the video signal processing method in the fourth preferred embodiment according to this invention.

Please refer to FIG. 3. FIG. 3 shows the flow chart of the video signal processing method in the fourth preferred embodiment according to this invention. The video signal processing method first sets a predetermined time period in step S31 and sets an index i as 1 in step S32. Step S33 is starting to count a processing time. An ith encoding procedure is performed in step S34. At the ith encoding procedure, the ith frame of the N frames is encoded in a full-image-encoding mode, the other frames are encoded in an adaptive-image-encoding mode, and the data amount of the N encoded frames is calculated. Step S35 is checking whether the processing time is larger than the predetermined time period. If the checking result of step S35 is NO, the method sets i=i+1 in step S36. Step S37 is checking whether i is larger than N. If the checking result of step S37 is NO, the method repeats step S34 through step S37. If the checking result of step S35 or S37 is YES, step S38 selects the N encoded frames with the smallest data amount among the encoding procedures been performed.

Figure 4:
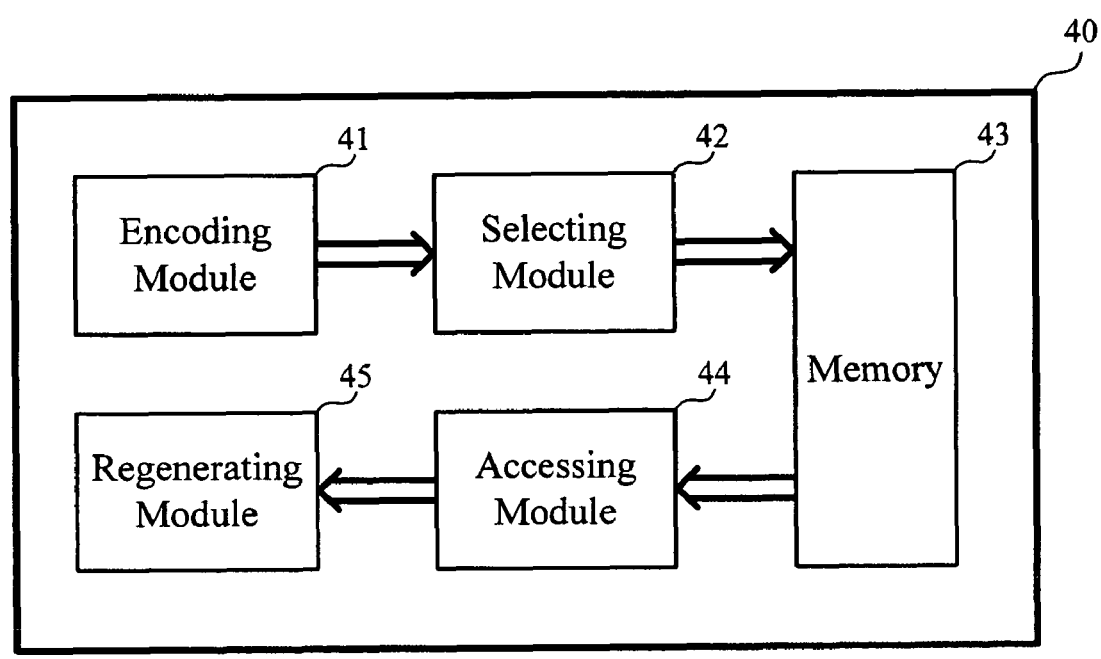
FIG. 4 shows the block diagram of the video signal processing apparatus in the fifth preferred embodiment according to this invention.

Please refer to FIG. 4. FIG. 4 shows the block diagram of the video signal processing apparatus in the fifth preferred embodiment according to this invention. The video signal processing apparatus 40 includes an encoding module 41, a selecting module 42, a memory 43, an accessing module 44, and a regenerating module 45. The video signal processing apparatus 40 can be viewed as a video storage system, for instance, a VCD or DVD recorder. The encoding module 41 and the selecting module 42 can be viewed as a video signal compressing unit. The memory 43 can be a disk drive or a storage medium. The accessing module 44 and the regenerating module 45 are used when the encoded images are requested to be played back.

The encoding module 41 performs a $1^{st}$ through a $N^{th}$ encoding procedure. The $1^{st}$ through the $N^{th}$ encoding procedure respectively encodes the $1^{st}$ through the $N^{th}$ frame among the N frames in a full-image-encoding mode, encodes other frames in an adaptive-image-encoding mode, and calculates the data amount of the N encoded frames in each encoding procedure, respectively. The selecting module 42 selects the N encoded frames with the smallest data amount among the encoding procedures been performed. The memory 43 is used for storing the N encoded frames selected by the selecting module 42. The accessing module 44 is used for accessing the N encoded frames from the memory 43. The regenerating module 45 is used to regenerate the encoded frames.

In actual applications, the video signal processing apparatus 40 can further include a timer. The timer sets a predetermined time period for the operations of the encoding module 41. The timer starts to count a processing time when the encoding module 41 starts to perform the $1^{st}$ encoding procedure. Once the processing time is larger than the predetermined time period, the selecting module 42 selects the N encoded frames corresponding to the smallest data amount among the data amounts calculated in the encoding procedures been performed.

In actual applications, there are also two different methods for the encoding module 41 to encode frames in an adaptive-image-encoding mode. The first method encodes adaptive-image-encoded frames based on the ith frame in the ith encoding procedure, wherein i is an integer index ranging from 1 to N. The second method encodes one adaptive-image-encoded frame based on the ith frame and the other adaptive-image-encoded frames.

If the encoding module 41 adopts the first method to encode frames, the regenerating module 45 regenerates one adaptive-image-encoded frame based on the full-image-encoded frame. If the encoding module 41 adopts the second method to encode frames, the regenerating module 45 regenerates one adaptive-image-encoded frame based on the full-image-encoded frame and the other adaptive-image-encoded frames.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An apparatus for processing a video signal with N frames, N being an integer larger than one, said apparatus comprising:
   an encoding module for performing a $1^{st}$ through a $N^{th}$ encoding procedure, the $1^{st}$ through the $N^{th}$ encoding procedure respectively selecting the $1^{st}$ through the $N^{th}$ frame among the N frames to be encoded in a full-image-encoding mode, encoding other frames in an adaptive-image-encoding mode, and calculating the data amount of the N encoded frames in the N encoding procedures, respectively; and
   a selecting module for selecting the N encoded frames with the smallest data amount among the encoding procedures been performed.

2. The apparatus of claim 1, further comprising:
   a timer for setting a predetermined time period for the operations of the encoding module, the timer starting to count a processing time when the encoding module starts to perform the $1^{st}$ encoding procedure, once the processing time is larger than the predetermined time period, the selecting module selects the N encoded frames corresponding to the smallest data amount among the data amounts calculated in the encoding procedures been performed.

3. The apparatus of claim 1, further comprising:
   an assigning module for assigning each encoded frame of the N encoded frames selected by the selecting module a respective serial number; and
   a sending module for sending the N encoded frames in sequence according to serial numbers.

4. The apparatus of claim 3, further comprising:
   a receiving module for receiving the N encoded frames in sequence according to serial numbers.

5. The apparatus of claim 1, further comprising:
   a sending module for sending the full-image-encoded frame of the N encoded frames first and then sending the adaptive-image-encoded frames of the N encoded frames.

6. The apparatus of claim 5, further comprising:
   a receiving module for receiving the full-image-encoded frame and the adaptive-image-encoded frames been sent.

7. The apparatus of claim 1, wherein at the ith encoding procedure in the encoding module, one adaptive-image-encoded frame is encoded based on the ith frame.

8. The apparatus of claim 7, further comprising:
   a memory for storing the N encoded frames selected by the selecting module;
   an accessing module for accessing the N encoded frames from the memory; and
   a regenerating module for regenerating one adaptive-image-encoded frame based on the full-image-encoded frame.

9. The apparatus of claim 1, wherein at the ith encoding procedure in the encoding module, one adaptive-image-encoded frame is encoded based on the ith frame and the other adaptive-image-encoded frames.

10. The apparatus of claim 9, further comprising:
    a memory for storing the N encoded frames selected by the selecting module;
    an accessing module for accessing the N encoded frames from the memory; and
    a regenerating module for regenerating one adaptive-image-encoded frame based on the full-image-encoded frame and the other adaptive-image-encoded frames.

* * * * *